Jan. 1, 1924
E. W. STEVENSON
GREASE PLUG FOR LOCOMOTIVES
Filed May 20, 1922
1,479,334
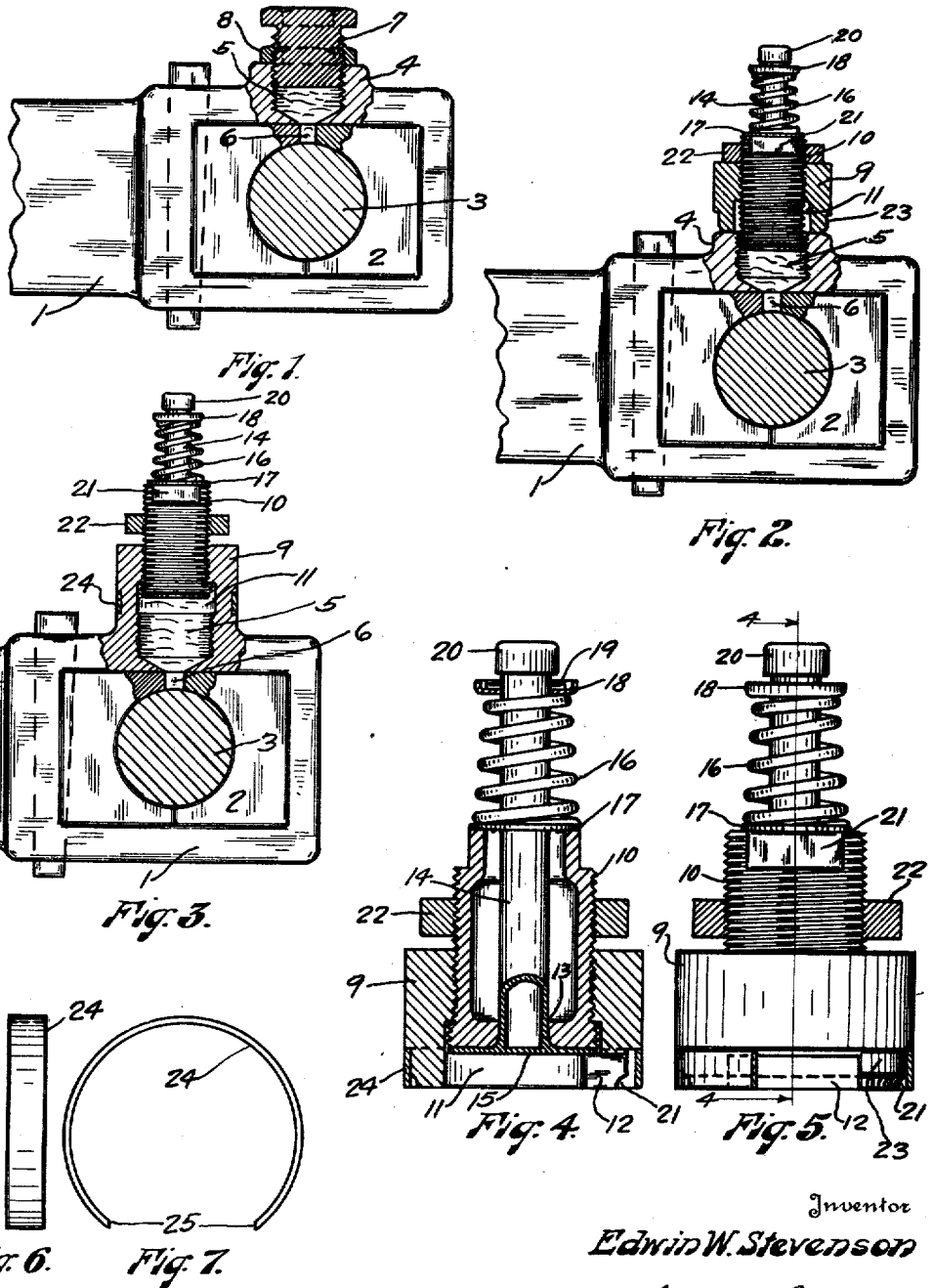
Inventor
Edwin W. Stevenson
By
A. J. O'Brien
Attorney Patented Jan. 1, 1924.

1,479,334

UNITED STATES PATENT OFFICE.

EDWIN WALTON STEVENSON, OF CHEYENNE, WYOMING, ASSIGNOR OF ONE-HALF TO CHARLES D. CAREY, OF CHEYENNE, WYOMING.

GREASE PLUG FOR LOCOMOTIVES.

Application filed May 20, 1922. Serial No. 562,455.

*To all whom it may concern:*

Be it known that I, EDWIN W. STEVENSON, a citizen of the United States, residing at Cheyenne, county of Laramie and State of Wyoming, have invented certain new and useful Improvements in Grease Plugs for Locomotives; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to grease plugs, and has special reference to plugs adapted to be used on locomotive connecting rods.

A locomotive connecting rod is constantly subjected to severe strain, due to its reciprocatory and circular motion as well as to strains imposed thereon by means of the force which it must transmit from the cylinders to the wheels. It is evident that the bearings of a connecting rod must be constantly supplied with a sufficient quantity of grease in order that it may be able to resist the wearing effects of the work which it is performing. It is customary to keep the connecting rod bearings lubricated with a good quality of hard oil or grease, and this is usually packed into boxes or openings provided therefor in the material of the rod itself; these openings are threaded and receive therein a threaded plug which is locked in place by a conventional lock nut. In spite of the lock nut these plugs very often shake loose and become lost, thus permitting sand and dirt to enter the grease cup and to get into the bearings, with disastrous results to the latter. Due to the great centrifugal force developed by the rapid rotation of the wheels, the grease is often thrown out of the cup when the plug is lost, with the result that the bearing becomes hot and destroys the brasses. It is evident that when the grease cup is closed by a threaded plug, it is impossible to tell, without first removing the plug, how much grease the cup contains and the engineer therefore has no way of determining this important particular, but must trust entirely to the thoroughness of the man whose duty it is to grease the engine. It sometimes happens that one or more places are overlooked in greasing, and considerable damage results thereform.

It is the object of this invention to produce a device that can be attached by means of electric or other autogenous welding to the outer end of the grease cups in common use, and which will positively prevent the plugs from becoming lost, and which is provided with means that will enable the engineer to readily determine the quantity of grease present in the cups whereby he can tell whether the cups have been properly filled. My improvement also enables the filling of the grease cups to be accomplished in a much less time than when the ordinary cups are used; in fact, actual experiments conducted by me have demonstrated that a considerable number of my cups may be filled in the time it requires to fill one of the old style cups.

In order to more clearly describe my invention, I shall have reference to the accompanying drawing, in which—

Fig. 1 shows the end of a connecting rod equipped with the ordinary grease cup and plug;

Fig. 2 shows my improvement attached to the connecting rod and shows the position of parts before the welding operation is performed;

Fig. 3 is a view similar to that of Fig. 2 and shows my improvement in place after it has been attached to the connecting rod by welding;

Fig. 4 is a vertical section of my improved plug member showing the relation of parts and their construction;

Fig. 5 shows a side elevation of the parts shown in Fig. 4;

Fig. 6 shows a side elevation of a spring ring employed for closing the entrance to the grease cup; and Fig. 7 shows a plan view of the spring member.

The same reference characters will be employed to designate the same parts throughout the several views.

Numeral 1 represents the end of a connecting rod, and 2 the brasses which engage the surface of the pin 3. In Fig. 1 I have shown what is the usual construction of the grease cup and plug, and in order to better disclose the same I have broken parts of the connecting rod and brasses away. The upper surface of the connecting rod is provided with a projection 4 which is bored out and threaded on the inside, thus forming a grease cup 5. A smaller opening 6 extends through the brasses to the inside thereof. A plug 7 serves to close the cup 5 and this is held in place by a lock nut 8. Experience has shown that the plug 7 will loosen and get lost in spite of the lock nut 8, and to overcome this difficulty I have devised the improvement which I will now describe.

Referring especially to Figs. 4 and 5, I take a piece of steel or iron 9, of substantially the same diameter as projection 4, and bore a hole axially therethrough. This hole has a diameter of such size that it can be threaded to receive a threaded plug 10, whose outside diameter is substantially equal to or slightly less than the inside diameter of the grease cup 5. The lower end of this hole is counter-bored as indicated by numeral 11, to a diameter equal to or slightly greater than the root diameter of the threads in the grease cup, so that a threaded plug which will fit the threads of the grease cup 5 will move freely within said counter-bore. An opening 12 is cut in the lower flange of the member 9 and serves as the opening through which the grease is introduced, as will hereinafter be fully described. Plug 10 is preferably made hollow as indicated in Fig. 4 and is made of two different diameters, the lower three or four threads being of a diameter that will properly cooperate with the threads in grease cup 5, and the remaining portion is of smaller diameter and fits the threads in member 9. It is apparent from the description above and an inspection of Fig. 4, that plug 10 can only be inserted into and removed from member 9 from below. Plug 10 has an axial opening therethrough or it may be made hollow as shown in Fig. 4 and have an opening 13 in its bottom. A plug 14 having a flanged head 15 of substantially the same diameter as the counter-bore 11 extends through the plug 10. Surrounding the upper end of said plug is a spring 16 whose lower end rests upon the washer 17 while its upper end abuts the dished washer 18 which is held from movement by the pin 19. The upper end of the plug 14 is provided with a massive cap 20, which may be threaded thereon and which serves as a means for receiving the blows of the hammer when the grease is tamped into the cup. Plug 10 has a squared section 21.

My invention is applied to the connecting rod as follows: The plug 7 and lock nut 8 are both removed and my improved device placed on top of the projection 4. Plug 10 is then turned down until the lower enlarged end thereof engages the threads within the cup 5. Member 9 is then adjusted so that opening 12 is directed to the front of the rod 1 or outwardly from the engine, although any other position, excepting an inwardly pointing one, will do. Member 9 is then welded to the projection 4 by means of an electric current or by any other means of autogenous welding, a groove 21 being provided around the lower edge of member 9 to provide a better welding surface. When members 4 and 9 are welded they form what is virtually a single piece, as shown in Fig. 2. Plug 10 may then be turned so as to be moved upwardly until it reaches the position shown in Figs. 3 and 4, when access may be had to the grease cup through opening 12. I will point out here that the threads on plug 10, although of different diameters, are of the same pitch, so that the plug 10 will always cooperate equally with both sets of threads. When it is desired to fill cup 5 with grease, plug 10 is moved to its topmost position and grease in the shape of a rectangular bar is introduced through opening 12 and shoved into the cup by means of pin 14 and flanged head 15. When a sufficient amount of grease has been introduced, plug 10 is screwed downwardly until the enlarged end engages the threads in cup 5, or into the position shown in Fig. 2. The lock nut 22 may then be tightened for the purpose of holding the plug in place.

In order to prevent dirt and dust from entering through opening 12 and finally getting into the grease cup, I provide the lower edge of member 9 with a channel 23 within which is rotatably mounted a spring 24 which is made in the form of an incomplete circle having an open space 25 between the ends thereof. When grease is to be introduced, the opening 25 is arranged to register with opening 12, but when the plug 10 is in the position shown in Fig. 2, a small amount of waste may be inserted into opening 12 and held in place by spring 24, which is rotated slightly, for the purpose of closing opening 12. The waste may be dispensed with if desired, and the spring 24 depended on to seal the opening 12 against the entrance of foreign matter.

From the above it will be apparent that I have devised a grease plug for locomotives that has a large number of advantages over those now in use. In the first place the plug 10 cannot get lost as the lower end is of such a large diameter that it will not pass upward through plug 9, and then by means of my improvement the grease cup can be much more quickly packed, and when the plug is in sealing position it is still possible to determine whether the box has been properly packed or not. Since the threads in the opening 5 and in member 9 are of the same pitch and adjusted so that they are in register with the corresponding threads on plug 10, the plug will have the full benefit of the threads in member 9 as well as those in opening 5, and therefore cannot be stripped when the plug is tightened.

I have shown plugs 10 and 14 hollow, as it is desirable to reduce the unbalancing effect to a minimum.

I am aware that minor changes in construction can be made without departing from the spirit of the invention, and I may make such changes as fall within the scope of the appended claims.

Having now described my invention, what I claim as new is—

1. A grease plug, comprising in combination, a grease cup having a threaded interior surface, a plug having its lower end adapted to engage the threads on the sides of the grease cup and having the remainder of its length of a smaller diameter, a member having a central opening therein and having the lower part of the opening therein of a diameter adapted to receive the large end of said plug, and the upper part of said opening threaded so as to engage the upper threaded portion of said plug.

2. A grease cup adapted to be employed in connection with a connecting rod bearing, comprising in combination, a grease cup having screw threads on its inner surface, a plug having an enlarged threaded end adapted to engage the threads on the grease cup, the upper end of said plug being of less diameter than the lower, a member having a threaded opening adapted to engage the upper end of said plug, said member being welded to said grease cup so as to virtually form a unitary part thereof, a radial opening from the outside into said grease cup, a plunger passing through the said plug and having an enlarged head adapted to pack the grease into the cup, and spring means for holding said plunger in its uppermost position.

3. An article of manufacture, comprising in combination, a tubular member having the upper portion of the opening threaded and the lower portion thereof of a larger diameter than the upper, a plug having the upper end thereof threaded and having the lower end of larger diameter than the upper whereby it can be inserted into and removed from the tubular member from below only, the diameter of the lower portion of said opening being sufficient to receive the enlarged end of the plug, said plug having an axial opening, a plunger reciprocably mounted in said opening, and a spring associated with said plunger and plug whereby the latter is resiliently held in an elevated position with respect to the plug.

4. An article of manufacture, comprising in combination, a tubular member having the upper portion of the opening threaded and the lower portion thereof of a larger diameter than the upper, a plug having the upper end thereof threaded and having the lower end of larger diameter than the upper whereby it can be inserted into and removed from the tubular member from below only, the diameter of the lower portion of said opening being sufficient to receive the enlarged end of the plug, a notch in the lower edge of said tubular member, a cylindrical spring cooperating with said member and adapted to close said notch, an axial opening through the plug, a plunger reciprocably mounted in said opening, said plunger having an enlarged head, a spring on said plunger cooperating with the plug and adapted to hold the plunger in elevated position, and a cap on the end of said plunger.

5. A grease plug comprising, in combination, a tubular member having the upper portion of the opening threaded and the lower portion thereof of larger diameter than the upper; a plug threadedly engaging the upper portion of said opening, the lower end of the plug being larger than the upper end, but smaller than the lower portion of said opening, whereby the plug can be inserted into and removed from the tubular member from below only, said plug having an opening extending longitudinally therethrough; a plunger reciprocally mounted in said last named opening, said plunger having a head of substantially the same diameter as the root diameter of the lower threaded portion of the plug; and means comprising a spring operatively connected to the plug and plunger and adapted to move the latter upwardly so that the head of the plunger will engage the bottom of the plug.

In testimony whereof I affix my signature.

EDWIN WALTON STEVENSON.